US010108548B2

(12) United States Patent
Rozario et al.

(10) Patent No.: US 10,108,548 B2
(45) Date of Patent: Oct. 23, 2018

(54) PROCESSORS AND METHODS FOR CACHE SPARING STORES (71) Applicant: Imagination Technologies Limited, Kings Langley (GB)

(72) Inventors: Ranjit J. Rozario, San Jose, CA (US); Era Nangia, Los Altos, CA (US); Debasish Chandra, Cupertino, CA (US); Ranganathan Sudhakar, Santa Clara, CA (US)

(73) Assignee: MIPS Tech, LLC, Santa Clara, CA (US)

( * ) Notice: Subject to any disclaimer, the term of this patent is extended or adjusted under 35 U.S.C. 154(b) by 21 days.

(21) Appl. No.: 14/829,458

(22) Filed: Aug. 18, 2015

(65) Prior Publication Data
US 2016/0055083 A1    Feb. 25, 2016

Related U.S. Application Data (60) Provisional application No. 62/039,356, filed on Aug. 19, 2014.

(51) Int. Cl.
*G06F 12/08* (2016.01)
*G06F 9/38* (2018.01)
(Continued)

(52) U.S. Cl.
CPC .............. *G06F 12/084* (2013.01); *G06F 9/38* (2013.01); *G06F 12/0811* (2013.01);
(Continued)

(58) Field of Classification Search
CPC ....... G06F 2212/1021; G06F 2212/281; G06F 2212/452; G06F 2212/608
See application file for complete search history.

(56) References Cited

U.S. PATENT DOCUMENTS

| 4,386,399 | A | * | 5/1983 | Rasala | ...... | G06F 9/26 |
| | | | | | | 710/307 |
| 4,924,379 | A | * | 5/1990 | Kirrmann | ...... | E04C 3/08 |
| | | | | | | 711/143 |

(Continued)

FOREIGN PATENT DOCUMENTS

GB                2335764 A       9/1999

*Primary Examiner* — Mano Padmanabhan
*Assistant Examiner* — Andrew J Cheong
(74) *Attorney, Agent, or Firm* — Vorys, Sater, Seymour and Pease LLP; Vincent M DeLuca (57) ABSTRACT In one aspect, a processor has a register file, a private Level 1 (L1) cache, and an interface to a shared memory hierarchy (e.g., an Level 2 (L2) cache and so on). The processor has a Load Store Unit (LSU) that handles decoded load and store instructions. The processor may support out of order and multi-threaded execution. As store instructions arrive at the LSU for processing, the LSU determines whether a counter, from a set of counters, is allocated to a cache line affected by each store. If not, the LSU allocates a counter. If so, then the LSU updates the counter. Also, in response to a store instruction, affecting a cache line neighboring a cache line that has a counter that meets a criteria, the LSU characterizes that store instruction as one to be effected without obtaining ownership of the effected cache line, and provides that store to be serviced by an element of the shared memory hierarchy.

21 Claims, 5 Drawing Sheets (51) Int. Cl.
  *G06F 12/084* (2016.01)
  *G06F 12/0811* (2016.01)
  *G06F 12/0815* (2016.01)
  *G06F 12/0842* (2016.01)
  *G06F 12/0888* (2016.01)

(52) U.S. Cl.
  CPC ...... *G06F 12/0815* (2013.01); *G06F 12/0842* (2013.01); *G06F 12/0888* (2013.01); *G06F 2212/1016* (2013.01); *G06F 2212/1021* (2013.01); *G06F 2212/452* (2013.01); *G06F 2212/608* (2013.01)

(56) References Cited

U.S. PATENT DOCUMENTS

| | | | | |
|---|---|---|---|---|
| 4,970,643 A * | 11/1990 | Cramm | G06F 12/1063 | 711/3 |
| 5,574,922 A * | 11/1996 | James | G06F 9/526 | 710/200 |
| 5,617,556 A * | 4/1997 | Baumgartner | G06F 12/0835 | 711/118 |
| 5,717,895 A * | 2/1998 | Leedom | G06F 9/30109 | 711/140 |
| 6,412,046 B1 * | 6/2002 | Sharma | G06F 12/0859 | 711/118 |
| 6,473,832 B1 * | 10/2002 | Ramagopal | G06F 9/3824 | 711/118 |
| 6,651,153 B1 * | 11/2003 | Orfali | G06F 11/3447 | 711/133 |
| 6,968,417 B1 * | 11/2005 | Chambers | G06F 13/122 | 710/310 |
| 2002/0010836 A1 * | 1/2002 | Barroso | G06F 12/0811 | 711/122 |
| 2003/0009641 A1 * | 1/2003 | Arimilli | G06F 12/0817 | 711/147 |
| 2003/0140200 A1 * | 7/2003 | Jamil | G06F 12/0833 | 711/145 |
| 2004/0073754 A1 * | 4/2004 | Cypher | G06F 12/0835 | 711/143 |
| 2004/0158682 A1 * | 8/2004 | Hooker | G06F 9/30047 | 711/144 |
| 2005/0154840 A1 * | 7/2005 | Greer | G06F 12/0822 | 711/145 |
| 2007/0079070 A1 | 4/2007 | Piry et al. | | |
| 2010/0005241 A1 | 1/2010 | Kim et al. | | |
| 2010/0037026 A1 * | 2/2010 | Hardy | G06F 12/0859 | 711/133 |
| 2010/0088473 A1 | 4/2010 | Kobayashi | | |
| 2012/0198177 A1 * | 8/2012 | Moyer | G06F 12/1441 | 711/140 |
| 2014/0181404 A1 * | 6/2014 | Chaudhary | G06F 12/0811 | 711/122 |

* cited by examiner

PROCESSORS AND METHODS FOR CACHE SPARING STORES

CROSS REFERENCE TO RELATED APPLICATIONS AND CLAIM OF PRIORITY

This application claims priority under 35 U.S.C. 119(e) from U.S. Provisional Application Ser. No. 62/039,356 filed Aug. 19, 2014, which is incorporated herein by reference in its entirety.

BACKGROUND

Field:

In one aspect, the following relates to processor microarchitecture and memory subsystems, and in one particular aspect, to approaches to processing memory transactions.

Related Art:

Processors require data on which to operate. Many processor architectures support a set of registers (a register file) that store data that can be used as operands for instructions. Access to a register file is fast. However, an amount of data that can be stored in a register file is relatively small (on the order of 32 64 bit words). Main memory is orders of magnitude cheaper and more plentiful than a register file. However, accessing main memory also is orders of magnitude slower than accessing a register file. Cache memories are interposed between a register file and a main memory in order to reduce traffic to and from main memory. Caches are often managed by hardware (rather than controlled by software), although some processor architectures support capabilities to pre-fetch data into a cache, for example. Caches generally operate on a principal of temporal locality of reference to data, which means that data that was recently used is more likely to be used again.

SUMMARY

In an aspect, a process in a processor comprises receiving a first store instruction to be executed in a load store unit of the processor. The process identifies a destination address from the first store instruction and associates a counter with the destination address. The process also receives subsequent store instructions, and for each subsequent store instruction, determines whether a respective destination address of that store instruction is within a cache line of the first store instruction, and responsively updates the counter. The process determines whether the respective destination address of that store instruction is within a cache line subsequent to the cache line of the first store instruction, and if a current value of the counter meets a criteria, and then characterizes the store instruction to the subsequent cache line as being a store without ownership and emits the store to a shared cache level of a memory hierarchy coupled with the processor.

DETAILED DESCRIPTION

The following disclosure presents an example of a processor that supports storage of data in caches that are expected to conform to a temporality locality reuse model while also more efficiently supporting exceptional memory transactions that are expected to violate a temporal locality.

Figure 1:
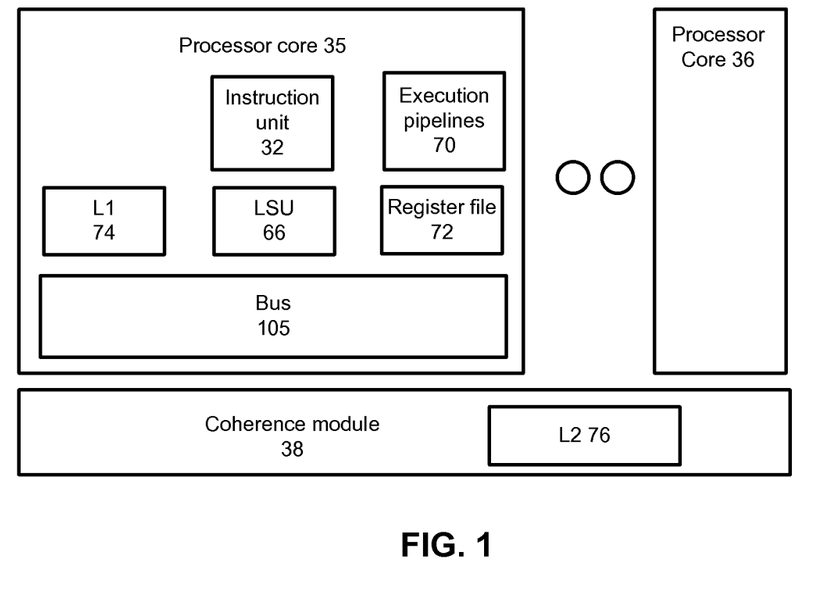
FIG. 1 depicts an example of a multicore processing system, in which different cores have private L1 caches and a shared L2 cache, and coherency is managed by a coherency module.

FIG. 1 depicts an example block diagram of a processing system 31 in which a plurality of processor cores (cores 35 and 36 enumerated) are coupled with a coherence module 38 that includes a Level 2 (L2) cache 76 that is shared among the plurality of processor cores. Here, a processor core can include, for example, as a set of execution resources, including an instruction unit 32, execution pipelines 70, a register file 72, a private Level 1 (L1) data cache 74, a Load/Store Unit (LSU) 66, and a bus 105. Implementations may have processor cores that are single-threaded, multi-threaded, in-order, out of order, superscalar, and so on.

The L1 caches 74 may be write back caches, such that changes made by either processor core 35 or 36 to data in its L1 cache 74 is not, as a matter of practice, immediately written also to the L2 cache 76, as with a write through cache. Instead, a coherency protocol may be employed that allows cache lines in each L1 cache to be maintained in a modified, shared, exclusive, or invalid state, for example. Different cache coherence protocols exist, but in a general case for a write back cache, these protocols all serve to delay traffic to coherence module 38 from processor cores 35 and 36, while also serving to provide current data, on request from the cores and to order transactions from each core.

When a processor core is to execute a store instruction, some approaches to cache coherency will perform a read for ownership of a cache-line-sized memory location that includes the effective address that is the target of the store instruction. The cache line is installed in the L1, which may cause an existing cache line in the L1 to be evicted. Such eviction causes a write of the evicted cache line to L2 76, and eventually to a main memory. In many cases, the read for ownership is a desired outcome, so that the data can be localized to a core that may use it several times within a relatively short time span. However, some workloads may benefit from a different approach to store operations. Some workloads may effectively write an entire cache line but not reuse any portion of it. For example, a memory copy operation transfers a dataset from one area in memory to another area in memory. Such an operation does not need to provide temporal locality for portions of the dataset being moved. In such circumstances, by installing each cache line in the L1 cache, the L1 cache is churned such that miss rates for data that does have temporal locality may increase. As such, Applicants appreciate that differentiating memory access operations that do not benefit from caching from those that do yields a variety of benefits.

Figures 2A, 2B:
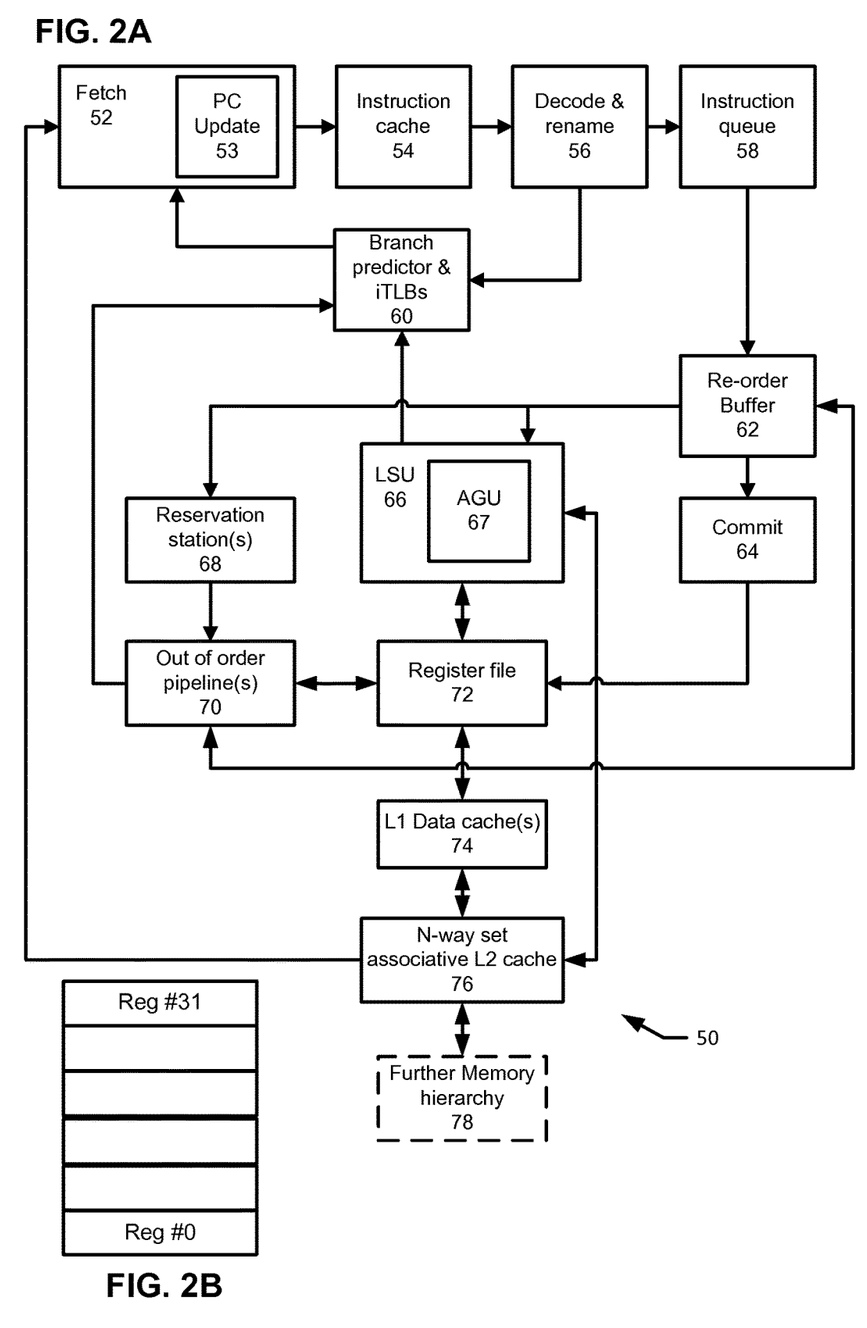
FIGS. 2A and 2B depict block diagrams pertaining to an example processor which can implement aspects of the disclosure.

FIG. 2A depicts an example diagram of functional elements of a processor 50 that supports 64-bit memory addressing according to aspects of the disclosure. The example elements of processor 50 will be introduced first, and then addressed in more detail, as appropriate. This example is of a processor that is capable of out of order execution; however, disclosed aspects can be used in an in-order processor implementation. As such, FIG. 2A depicts functional elements of a microarchitectural implementation of the disclosure, but other implementations are possible. Also, different processor architectures can implement aspects of the disclosure. The names given to some of the functional elements depicted in FIG. 2A may be different among existing processor architectures, but those of ordinary skill would understand from this disclosure how to implement the disclosure on different processor architectures, including those architectures based on pre-existing architectures and even on a completely new architecture.

Processor 50 includes a fetch unit 52, which is coupled with an instruction cache 54. Fetch unit 52 is responsible for retrieving data to be interpreted as instructions. Instruction cache 54 is coupled with a decode and rename unit 56. Decode and rename unit 56 is coupled with an instruction queue 58 and also with a branch predictor that includes an instruction Translation Lookaside Buffer (iTLB) 60. Instruction queue 58 is coupled with a ReOrder Buffer (ROB) 62 which is coupled with a commit unit 64. ROB 62 is coupled with reservation station(s) 68 and a Load/Store Unit (LSU) 66. Reservation station(s) 68 are coupled with Out of Order (OO) execution pipeline(s) 70. Execution pipeline(s) 70 and LSB 66 each couple with a register file 72. LSU 66 performs loads and stores of data to and from memory. For example, LSU 66 may execute loads and stores of different sizes (e.g., byte, word, and double word.)

Register file 72 couples with an L1 data cache(s) 74. L1 cache(s) 74 couple with an N-way interleaved L2 cache 76. Applications of the disclosure can be applied to direct-mapped caches and to fully associative caches, and an N-way interleaved cache is an example. In one example, N is 8 or 16, depending on a size of L2 cache 76. Processor 50 may also have access to further memory hierarchy elements 78. Fetch unit 52 obtains instructions from a memory (e.g., L2 cache 76, which can be a unified cache for data and instructions). Fetch unit 52 can receive directives from branch predictor 60 as to which instructions should be fetched.

Functional elements of processor 50 depicted in FIG. 2A may be sized and arranged differently in different implementations. For example, instruction fetch 52 may fetch 1, 2, 4, 8 or more instructions at a time. Decode and rename 56 may support different numbers of rename registers and queue 58 may support different maximum numbers of entries among implementations. ROB 62 may support different sizes of instruction windows, while reservation station (s) 68 may be able to hold different numbers of instructions waiting for operands and similarly LSB 66 may be able to support different numbers of outstanding reads and writes. Instruction cache 54 may employ different cache replacement algorithms and may employ multiple algorithms simultaneously, for different parts of the cache 54. Defining the capabilities of different microarchitecture elements involve a variety of tradeoffs beyond the scope of the present disclosure.

Implementations of processor 50 may be single threaded or support multiple threads. Implementations also may have Single Instruction Multiple Data (SIMD) execution units. Execution units may support integer operations, floating point operations or both. Additional functional units can be provided for different purposes. For example, encryption offload engines may be provided. FIG. 2A is provided to give context for aspects of the disclosure that follow and not by way of exclusion of any such additional functional elements. This is a non-exhaustive enumeration of examples of design choices that can be made for a particular implementation of processor 50.

FIG. 2B depicts that register file 72 of processor 50 may include 32 registers. Each of these registers contains 64-bits. Each register may be identified by a binary code associated with that register. In a simple example, 00000b identifies Register 0, 11111b identifies Register 31, and registers in between are numbered accordingly. Processor 50 performs computation according to specific configuration information provided by a stream of instructions. These instructions are in a format specified by the architecture of the processor. An instruction may specify one or more source registers, and one or more destination registers for a given operation. The binary codes for the registers are used within the instructions to identify different registers. The registers that can be identified by instructions can be known as "architectural registers", which present a large portion, but not necessarily all, of the state of the machine available to executing code. Implementations of a particular processor architectural may support a larger number of physical registers. Having a larger number of physical registers allows speculative execution of instructions that refer to the same architectural registers. Register file 72 may have different numbers and kinds of ports in different implementations. For example, some implementations may supply two ports, while others may supply more. Some implementations may have designated read ports and write ports.

In some implementations, register file 72 has general purpose registers that are 64 bits in length. Cache line sizes may be 128, 256, 512 bits, or more, with most implementations having cache line sizes being either 256 or 512 bits. When data is transferred between memory locations, using the register file as an intermediary, data is transferred in increments equal to a size of the registers. Therefore, multiple store operations are required in order to transfer a cache-line sized portion of data (e.g., 8 for a 256 bit cache line or 16 for a 512 bit cache line).

For convenience, and to generally depict a flow of data within a processor, functional module diagrams of processors often are depicted with separate lines between a register file 72 and various components, such as L1 cache, Load/Store unit, an L2, and ALU, and so on. However, physical connectivity between these functional modules differs such a depiction. Rather, there are limited ports on a register file, and when one transaction is occurring, another transaction is not. Therefore, transactions on a register file are not without opportunity cost, and avoiding some such transactions may enable higher performance, by allowing others to proceed.

A memory copy operation presents an example situation in which the algorithm may be trivially encoded by a loop that increments an effective read address and an effective write address, and includes a load instruction from the effective read address directed to a destination register, and a store instruction directing the register contents to the effective write address.

Such a simplistic translation of the memory copy operation does not necessarily map well to specific processor architectures. For example, unrolling the loop to include a series of loads and stores may be a benefit. However, processors may block other pending reads and writes while waiting for a cache line to return. Also, many high performance processor cores support issue of multiple load and/or store instructions on a single clock, such processors also may be multithreaded, and if supporting these capabilities, also are typically capable of executing instructions out of program order.

In view of these various capabilities, Applicants provide an approach to detecting patterns of stores that present an opportunity to avoid private L1 cache pollution. Such approach can be implemented within a load/store unit of a processor core (e.g., LSU 66), and practiced as a process. More generally, circuitry that is operating under programmatic instruction control may implement aspects of the disclosure.

Figure 3:
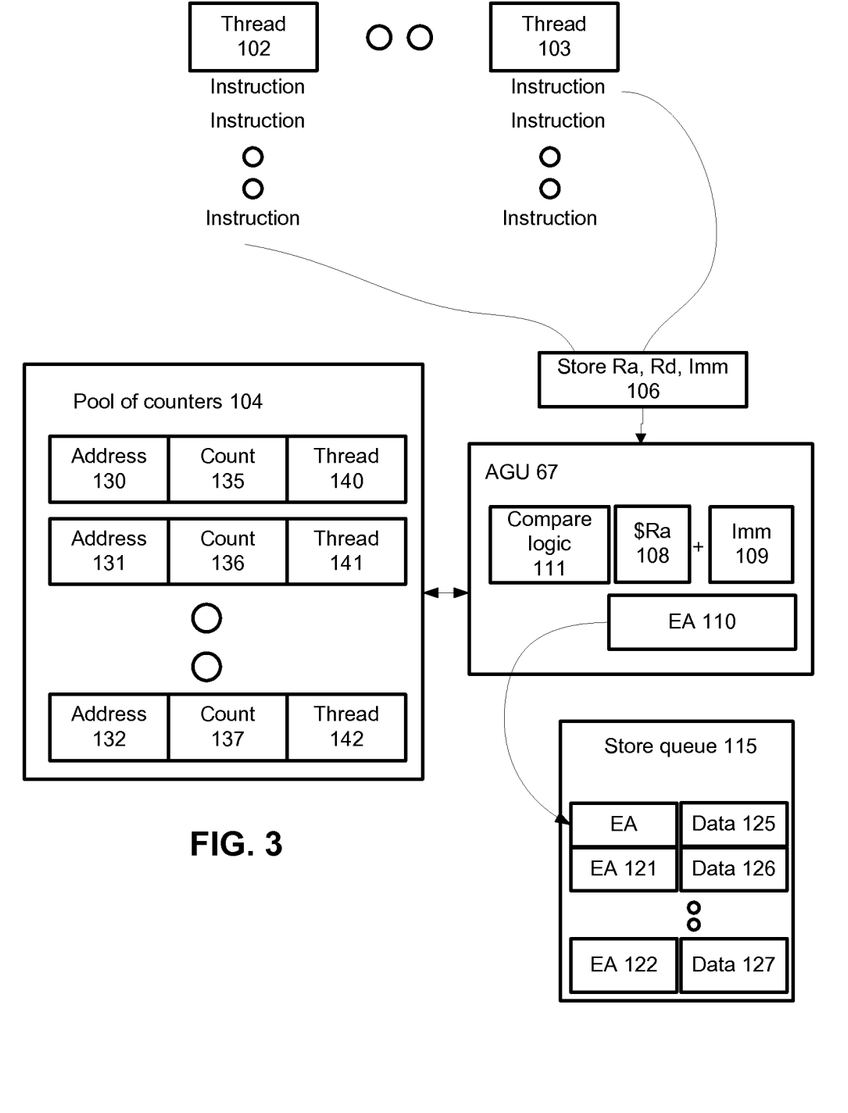
FIG. 3 depicts aspects of a Load Store unit according to the disclosure.

FIG. 3 depicts aspects of how example AGU 67 may operate according to the disclosure. AGU 67 receives a store instruction 106. This store instruction may store an instruction from any of multiple threads, where threads 102 and 103 are depicted. Each thread for which instructions are being issued may include store instructions and other instructions to be processed. For example, each thread may include load instructions, and arithmetic instructions. In some situations, an instruction stream for a thread may be predominantly store instructions, load instructions or a mixture of load and store instructions. A mixture of instructions also may be affected based on what level of granularity an instruction stream is being considered. For example, a memory copy operation may be succinctly expressed as a loop, where contents of a current memory address is loaded into a register, and then a store instruction stores the contents that register into a different memory location. A respective effective address for each of the load and the store can be incremented. For example, if performing word-sized stores, in a byte-addressable memory, then each of these addresses may be incremented by four.

Although this high-level conception is not incorrect, a compiler may attempt to optimize code to implement such a loop by unrolling the loop so that each iteration through the loop emits a plurality of load instructions and a plurality of store instructions without incrementing the counter. For example, in a processor that supports multiple instruction issue on a given clock cycle, unrolling the loop in such manner may be that four loads and four stores are processed each time through the loop. Latency to satisfy loads are often high relative to completion of other instructions, and may be variable, depending on a location of such data to be loaded.

Also, processors typically address memory more granularly than an amount of data represented in a cache line. For example, load and store instructions may address 4 bytes or 8 bytes of data in a processing system with a 32 byte or a 64byte cache line. As such, issuing a sequence of loads may cause LSU 66 to service these loads by obtaining ownership of a cache line containing the effective address of each load. Obtaining ownership would involve installing each cache line in L1 cache 74, which may involve evicting existing data for a location in L1 cache 74 that will receive the cache line being installed. If a cache line containing the effective address of a store instruction is in L1 cache 74, then that store instruction can be completed by updating data in L1 cache 74 (assuming that the data is available to be modified under a cache coherency protocol being used). Then, that cache line may be written back to the memory hierarchy (e.g., L2 cache 76 in FIG. 1) at some point, such as according to demand for that cache line by processor core 36. In the case of a memory copy operation, it is unlikely that a cache line for a particular store instruction will be in L1 cache 74, at a time when a first instruction referencing that cache line is received at LSU 66. So, LSU 66 would typically generate a request for ownership of the now-referenced cache line, so that this cache line can be brought into L1 cache 74, for modification according to the store instruction. Loading this cache line into a location of L1 cache 74 also may cause eviction of existing data in L1 cache 74. In order to evict data from L1 cache 74, memory transactions must be serviced.

Although many conceptual processor microarchitecture diagrams show separate connections between an L1 74, and a memory hierarchy, and between L1 74 and a register file 72, and between various functional units in execution pipelines 70 and register file 72, in reality, many of these conceptually separate data interconnects are implemented using the same physical resources. Therefore, additional transactions in order to service L1 74 may affect a capability to service other functions in processor core 35. Considered specifically in the context of an example of memory copy operations, both the sequence of loads and the sequence of stores has a tendency to churn L1 cache, causing a large number of evictions, which in turn generate additional traffic to be serviced by a memory interface.

Although the load and store instructions may initially originate from a single thread and the source code may be readily understandable, by a skilled artisan examining the source code, as causing a certain memory access pattern, from a perspective of LSU 66, the load and store instructions are just instructions to be performed. In a high performance processor, these instructions may be performed out of order, in dependence on readiness of some instructions to be performed and not others (e.g., for a store instruction, calculation of an effective address may have a dependency, or data to be stored may not be available). Also, multiple threads of instructions may be processed by processor core 35, and thus load instructions and store instructions may be arriving at LSU 66 for a plurality of threads. Another cost of this kind of memory access pattern are the updates to different tag structures that consume bandwidth required to service requests for other instructions, such as arithmetic instructions.

Figures 4, 5:
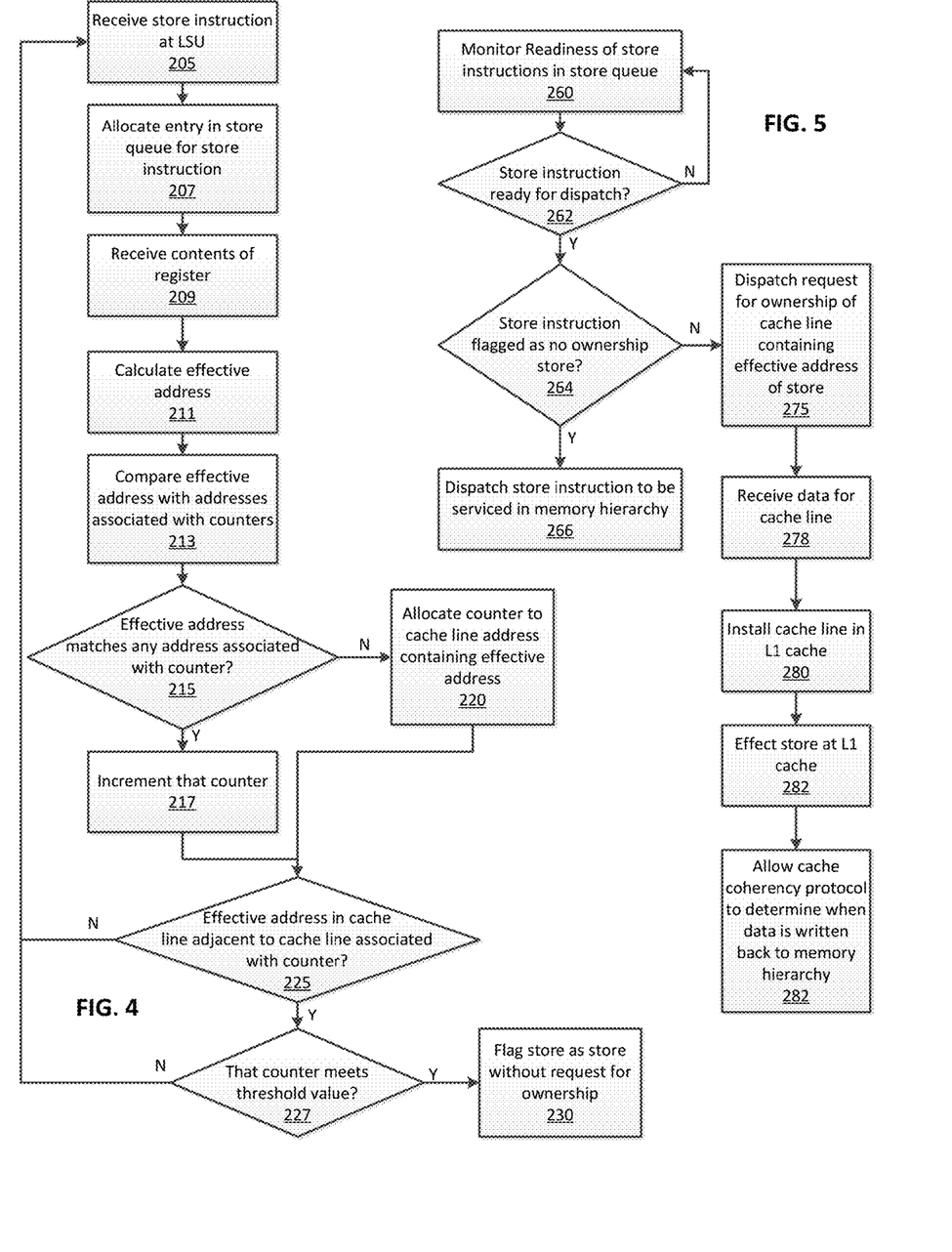
FIGS. 4 and 5 depict example processes according to the disclosure.
Figure 6:
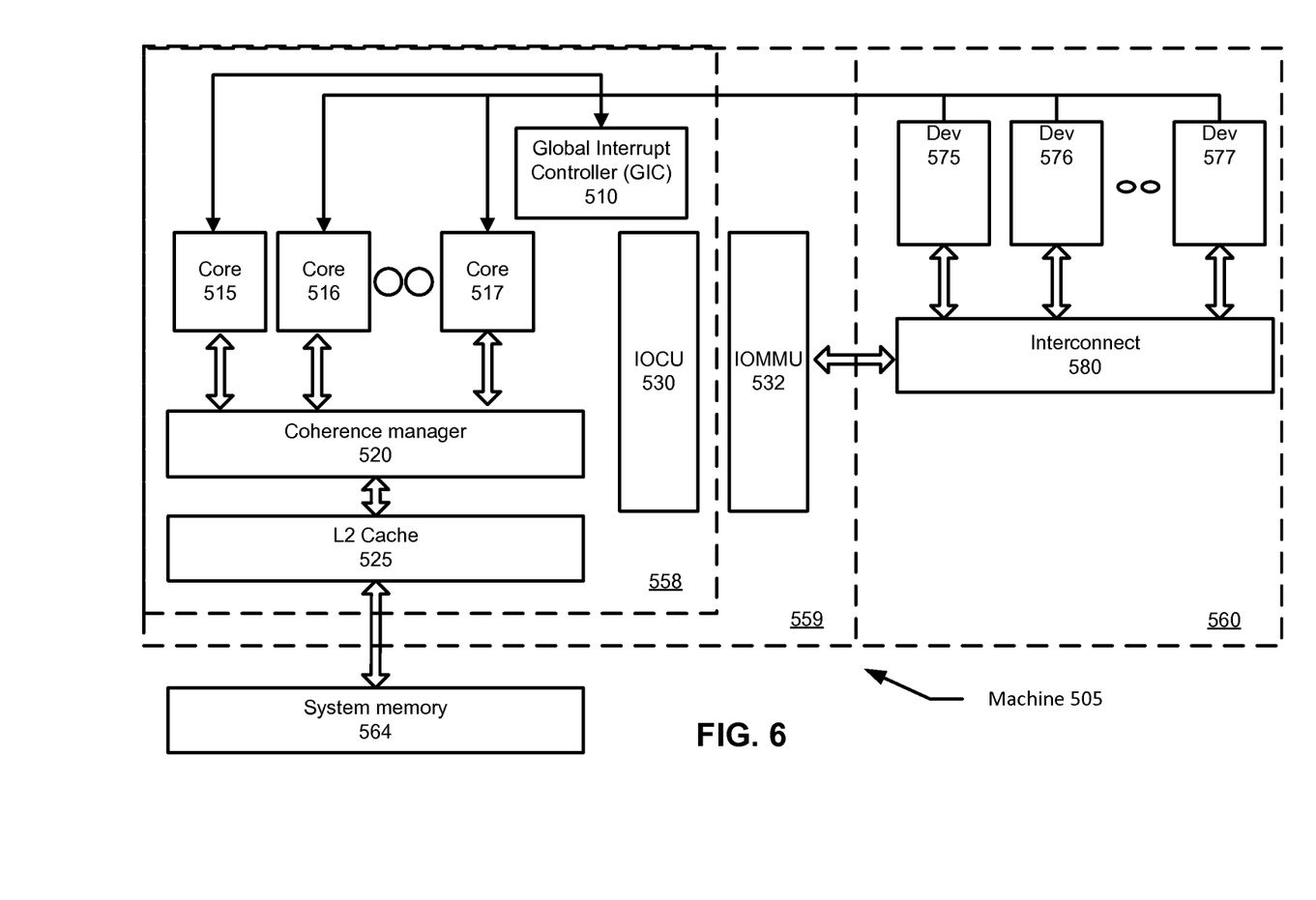
FIG. 6 depicts a block diagram of an example hardware-oriented machine that can implement aspects of the disclosure.

FIGS. 3-5 depict an example approach to characterizing store instructions as either store instructions for which ownership of a cache line is to be obtained and those for which ownership of a cache line should not be obtained. In particular, FIG. 3 depicts an example of an implementation of portions of LSU 66, while FIGS. 5 and 6 depict aspects of example processes that can be implemented in LSU 66. In FIG. 3, using store instruction 106 as an example, store instruction 106 references registers Ra and Rd, and specifies an immediate 109. In FIG. 4, at 205, a store instruction is received.

A value from Ra ($Ra 108) is to be added to immediate 109 in order to produce an effective address (EA) 110. A value from Rd ($Rd) is to be stored in EA 110. AGU 67 performs the addition of $Ra 108 and immediate 109 after contents of the register identified by Ra are provided to AGU 67. Pending calculation of EA 110, a location in a store queue 115 may be allocated for store instruction 106 (action 207 of FIG. 4). Once EA 110 is available (actions 209 and 211 of FIG. 4), EA 110 can be populated in the allocated location. Similarly, performance of store instruction 106 may await availability of data from the register identified by Rd. Store queue 115 may contain a field to hold such data (e.g., data fields 125-127, corresponding respectively to EA 110, 121 and 122). Other implementations may perform store operations in store queue 115 in response to data availability, such that data may not be stored in store queue 115 and store queue 115 may not have memory provided for such purpose.

FIG. 3 depicts that a pool of counters 104 couples with AGU 67. Pool of counters 104 includes a plurality of counters, each of which provides a field for storing at least a portion of a memory address (130-132), a counter 135-137, and optionally, a thread identifier 140-142. AGU 67 includes compare logic 111, which is operable to compare at least a portion of EA 110 with values stored in address fields 130-132. In one example, a portion of a full address is stored in address fields 130-132 sufficient to uniquely identify a cache line. For example, in a byte-addressable memory, 32 byte cache line occupies $2^5$ address bits, while a 64 byte cache line occupies $2^6$ address bits. If 32 bit memory addresses are used, then address fields 130-132 may use 27 or 26 bits, for example. In FIG. 4, compare logic 111 may compare EA 110 with addresses in the address fields 130-132. At 215, if EA 110 is found to match a value in any of these address fields, then the value in the associated counter field is incremented at 217. Otherwise, a counter is allocated, at 220, to EA 110. Such allocation effectively initiates tracking of store instructions that address addresses within the same cache line as EA 110. In an example, each counter may be initialized to 0. Each counter may include a number of bits sufficient to count up to a number of store instruction required to move an entire cache line from one location to another in memory (e.g., for 4 byte stores and 32 byte cache lines, the counter may count up to 8, thus requiring 3 bits).

At 225 in FIG. 4, it is determined whether a store instruction (e.g. store 106) is adjacent to a cache line that is associated with a counter. For example, the store instruction may reference an effective address in a cache line immediately subsequent to a cache line for which a counter is allocated. At 227, it is determined whether the counter value for that adjacent cache line meets a threshold value, and if so, then the store instruction is flagged as a store instruction that is to be serviced without a request for ownership of the cache line including the effective address for that store instruction. For example, cache line 1 may have a counter value of 5, meaning that 5 store instructions have been seen by LSU 66 that have effective addresses in that cache line. Then, LSU 66 receives a store instruction for which an effective address is in cache line 2. LSU 66 accesses the counter value for cache line 1, and compares that value to a threshold, and determines whether to process that received store instruction either with or without a request for ownership. In an example, a threshold may be set at one half, two thirds, three-fourths, or seven-eighths of a total possible number of unique stores to fill a cache line. The threshold may be set based on how aggressively the processor may reorder operations, how many threads are being processed, or which may be concurrently processed by the processor.

At 225, 227 and 230 in FIG. 4, if any respective decision is negative, then the process may continue by receiving a subsequent store instruction at 205.

FIG. 5 depicts an example process to be implemented in LSU 66, in order to select store instructions to be performed. At 260, readiness of store instructions in store queue 115 is monitored, and it is determined at 262 whether a store instruction is ready for dispatch. At 264, if such store instruction is flagged as a 'no ownership' store, then at 266, that store is dispatched to be serviced in the memory hierarchy. In other words, a cache line containing an effective address of that store instruction is not loaded into L1 cache 74, from the memory hierarchy, and the update made in L1 cache 74. Rather, the update is permitted to be made, for example, within coherence module 38 directly in L2 cache 76.

At 264, if the store is not flagged as a no ownership store, then ownership of the implicated cache line is obtained. In an example, this may include requesting, at 275, ownership, receiving data for the cache line at 278, installing the cache line at 280, storing the data into the relevant portion of L1 cache 74 at 282, and allowing a coherency protocol to determine when that cache line is evicted from L1 cache 74 for updating other memories.

A variety of different structures and techniques may be employed by coherence module 38 and by processor cores 35 and 36 (and/or other processor cores no depicted) in order to maintain coherency. For example, when coherence module 38 updates L2 cache 76, coherence module 38 may broadcast an invalidate signal, which indicates to all other processors that copies of the updated cache line, which may have been in a shared state, are now invalid. In such an approach, other cores would not snoop the L1 for the core that issued the store instruction, because the cache line was not brought into that L1. Cores that need the cache line may then fetch the cache line from L2 76. In another implementation, the updated cache line may be broadcast, and cores may detect the cache line and update their L1 caches.

FIG. 6 depicts an example of a machine 505 that implements execution elements and other aspects disclosed herein. FIG. 6 depicts that different implementations of machine 505 can have different levels of integration. In one example, a single semiconductor element can implement a processor module 558, which includes cores 515-517, a coherence manager 520 that interfaces cores 515-517 with an L2 cache 525, an I/O controller unit 530 and an interrupt controller 510. A system memory 564 interfaces with L2 cache 525. Coherence manager 520 can include a memory management unit and operates to manage data coherency among data that is being operated on by cores 515-517. Cores may also have access to L1caches that are not separately depicted. In another implementation, an I/O Memory Management Unit (IOMMU) 532 is provided. IOMMU 532 may be provided on the same semiconductor element as the processor module 558, denoted as module 559. Module 559 also may interface with I/O devices 575-577 through an interconnect 580. A collection of processor module 558, which is included in module 559, interconnect 580, and I/O devices 575-577 can be formed on one or more semiconductor elements. In the example machine 505 of FIG. 6, cores 515-517 may each support one or more threads of computation, and may be architected according to the disclosures herein.

Although some subject matter may have been described in language specific to examples of structural features and/or method steps, it is to be understood that the subject matter defined in the appended claims is not necessarily limited to these described features or acts. For example, a given structural feature may be subsumed within another structural element, or such feature may be split among or distributed to distinct components. Similarly, an example portion of a process may be achieved as a by-product or concurrently with performance of another act or process, or may be performed as multiple separate acts in some implementations. As such, implementations according to this disclosure are not limited to those that have a 1:1 correspondence to the examples depicted and/or described.

Above, various examples of computing hardware and/or software programming were explained, as well as examples how such hardware/software can intercommunicate. These examples of hardware or hardware configured with software and such communications interfaces provide means for accomplishing the functions attributed to each of them. For example, a means for performing implementations of software processes described herein includes machine executable code used to configure a machine to perform such process. Some aspects of the disclosure pertain to processes carried out by limited configurability or fixed function circuits and in such situations, means for performing such processes include one or more of special purpose and limited-programmability hardware. Such hardware can be controlled or invoked by software executing on a general purpose computer.

Aspects of functions, and methods described and/or claimed may be implemented in a special purpose or general-purpose computer including computer hardware, as discussed in greater detail below. Such hardware, firmware and software can also be embodied on a video card or other external or internal computer system peripherals. Various functionality can be provided in customized FPGAs or ASICs or other configurable processors, while some functionality can be provided in a management or host processor. Such processing functionality may be used in personal computers, desktop computers, laptop computers, message processors, hand-held devices, multi-processor systems, microprocessor-based or programmable consumer electronics, game consoles, network PCs, minicomputers, mainframe computers, mobile telephones, PDAs, tablets and the like.

Aspects disclosed herein will generally exist in the context of larger systems and components of systems. For example, processing can be distributed over networks, such as local or wide area networks and may otherwise be implemented using peer to peer technologies and the like. Division of tasks can be determined based on a desired performance of the product or system, a desired price point, or some combination thereof. In embodiments implementing any of the described units at least partially in software, computer-executable instructions representing unit functionality can be stored on computer-readable media, such as, for example, magnetic or optical disks, flash memory, USB devices, or in networks of storage devices such as NAS or SAN equipment, and the like. Other pertinent information, such as data for processing can also be stored on such media.

In addition to hardware embodiments (e.g., within or coupled to a Central Processing Unit ("CPU"), microprocessor, microcontroller, digital signal processor, processor core, System on Chip ("SOC"), or any other programmable or electronic device), implementations may also be embodied in software (e.g., computer readable code, program code, instructions and/or data disposed in any form, such as source, object or machine language) disposed, for example, in a computer usable (e.g., readable) medium configured to store the software. Such software can enable, for example, the function, fabrication, modeling, simulation, description, and/or testing of the apparatus and methods described herein. For example, this can be accomplished through the use of general programming languages (e.g., C, C++), GDSII databases, hardware description languages (HDL) including Verilog HDL, VHDL, SystemC Register Transfer Level (RTL) and so on, or other available programs, databases, and/or circuit (i.e., schematic) capture tools. Embodiments can be disposed in computer usable medium including non-transitory memories such as memories using semiconductor, magnetic disk, optical disk, ferrous, resistive memory, and so on.

As specific examples, it is understood that implementations of disclosed apparatuses and methods may be implemented in a semiconductor intellectual property core, such as a microprocessor core, or a portion thereof, embodied in a Hardware Description Language (HDL)), that can be used to produce a specific integrated circuit implementation. A computer readable medium may embody or store such description language data, and thus constitute an article of manufacture. A non-transitory machine readable medium is an example of computer readable media. Examples of other embodiments include computer readable media storing Register Transfer Language (RTL) description that may be adapted for use in a specific architecture or microarchitecture implementation. Additionally, the apparatus and methods described herein may be embodied as a combination of hardware and software that configures or programs hardware.

Also, in some cases terminology has been used herein because it is considered to more reasonably convey salient points to a person of ordinary skill, but such terminology should not be considered to impliedly limit a range of implementations encompassed by disclosed examples and other aspects.

Also, a number of examples have been illustrated and described in the preceding disclosure. By necessity, not every example can illustrate every aspect, and the examples do not illustrate exclusive compositions of such aspects. Instead, aspects illustrated and described with respect to one figure or example can be used or combined with aspects illustrated and described with respect to other figures. As such, a person of ordinary skill would understand from these disclosures that the above disclosure is not limiting as to constituency of embodiments according to the claims, and rather the scope of the claims define the breadth and scope of inventive embodiments herein. The summary and abstract sections may set forth one or more but not all exemplary embodiments and aspects of the invention within the scope of the claims.

We claim:

1. A process implemented in a processor, comprising:
    receiving a first store instruction to be executed in a load store unit of the processor;
    identifying a destination address from the first store instruction;
    associating a counter with the destination address; and
    receiving a subsequent store instruction and in response to determining that a respective destination address of the subsequent store instruction is within a cache line of the first store instruction, updating the counter, and
    in response to determining that the respective destination address of the subsequent store instruction is within a cache line subsequent to the cache line of the first store instruction, and if a current value of the counter meets a criteria, then characterizing the subsequent store instruction to the subsequent cache line as being a store without ownership and emitting the store without ownership to a shared cache level of a memory hierarchy coupled with the processor.

2. The process implemented in a processor of claim 1, wherein, for each subsequent store instruction, the determining whether a respective destination address of each subsequent store instruction that is within a cache line of the first store instruction, is performed responsively to calculating, within an address generation unit of the load store unit, the respective destination address.

3. The process implemented in a processor of claim 1, further comprising requesting ownership of the cache line for the first store instruction.

4. The process implemented in a processor of claim 1, further comprising allocating the counter, from a pool of counters, prior to associating the counter with the destination address.

5. The process implemented in a processor of claim 1, further comprising, within the load store unit, tracking each store instruction according to which thread, of a plurality of threads, issued that store instruction.

6. The process implemented in a processor of claim 1, wherein the associating the counter with the destination address comprises associating the counter with a most-significant-bit portion of the destination address.

7. The process implemented in a processor of claim 2, wherein a most-significant-bit portion of the destination address uniquely identifies a cache line within a Level 2 cache of the memory hierarchy.

8. The process implemented in a processor of claim 1, further comprising, if the subsequent store instruction to the subsequent cache line is not characterized as a store without ownership, then generating a signal to request ownership of the subsequent cache line by the processor, and upon receiving data for the subsequent cache line from the memory hierarchy, installing the data for the subsequent cache line in a Level 1 cache.

9. The process implemented in a processor of claim 1, wherein each load instruction stores 64 bits, and each cache line is 512 bits.

10. A process implemented in a processor, comprising:
counting, for each of a plurality of cache lines within a memory hierarchy, a number of store instructions received by a Load Store Unit (LSU) of the processor that identify an effective address within each respective cache line; and
treating each store instruction as a store that requests ownership of the cache line containing the effective address of that store instruction, unless a count of the number of store instructions received for a neighboring cache line is greater than a pre-determined value, and when the count of the number of store instructions received for said neighboring cache line is greater than said pre-determined value, dispatching the store instruction to be serviced by the memory hierarchy, without obtaining ownership of that cache line.

11. A processor, comprising:
a private Level One (L1) cache;
a register file;
an interface to a memory hierarchy shared with one or more other processors;
a decoder configured to decode instructions from data, the instructions comprising a store instruction, which identifies a register in the register file and specifies an effective address to which data in the identified register is to be stored; and
a Load/Store Unit (LSU) configured to receive a decoded store instruction, the LSU comprising a set of counters, each capable of being associated with an address of cache line that contains the effective address from the decoded store instruction, in response to determining that other received decoded store instructions are within a first cache line, updating that counter, and, responsive to receiving a decoded store instruction that is within a cache line neighboring a cache line associated with a counter, and a value of that counter meeting a criteria, then outputting the decoded store instruction that is within the cache line neighboring the cache line associated with the counter for servicing by the memory hierarchy, without gaining ownership of the cache line according to a coherency protocol used within the memory hierarchy.

12. The processor of claim 11, wherein the effective address in each store instruction is specified according to an addressing mode, of a plurality of addressing modes supported by the processor.

13. The processor of claim 12, wherein the plurality of addressing modes supported by the processor includes a register-indirect mode, in which a store instruction specifies a register and an immediate value to be added to contents of the specified register, in order to determine the effective address.

14. The processor of claim 13, wherein the LSU receives the contents of the specified register and the immediate value and determines the effective address within an address generation unit.

15. The processor of claim 14, wherein the LSU comprises a buffer that maintains data for outstanding store operations waiting to be performed, and the LSU is configured to characterize each outstanding store operation as either a store with ownership or a store without ownership in response to determining the effective address within the address generation unit.

16. The processor of claim 11, wherein the processor is capable of supporting multiple independent threads of execution, and the LSU is configured to allocate counters per-thread.

17. The processor of claim 11, wherein each cache line stores data for at least 8 store instructions.

18. The processor of claim 11, wherein each cache line stores 512 bits, and each store instruction addresses either 32 bits or 64 bits of data.

19. A process, comprising:
issuing, from an instruction decode unit in a processor, store instructions that each specify information for use in calculating an effective address, and a register containing data to be stored at the effective address in a memory hierarchy;
upon calculating the effective address of each of the store instructions, counting a number of store instructions received for a cache line containing the effective address; and
responsive to receiving one of the store instructions for a cache line that is either directly before or directly after a cache line for which the number of store instructions received is greater than a threshold, characterizing that received store instruction as a store instruction for which ownership of that cache line should not be requested by the processor, from the memory hierarchy.

20. The process of claim 19, wherein, if any store instruction has not been characterized as a store for which ownership of a respective cache line should not be requested, the process further comprises requesting ownership of that respective cache line, and upon receiving data for that respective cache line, installing that data in a location in an L1 cache private to the processor.

21. The process of claim 19, further comprising buffering store instructions waiting to be performed and opportunistically performing the store instructions as dependencies are removed.

* * * * *